United States Patent Office 3,746,669
Patented July 17, 1973

3,746,669
REINFORCED RUBBER COMPOSITION
Donald D. Dunnom, Pittsburgh, Pa., and Melvin P. Wagner, Barberton, and George C. Derringer, Akron, Ohio, assignors to PPG Industries, Inc., Pittsburgh, Pa.
No Drawing. Continuation-in-part of application Ser. No. 8,059, Feb. 2, 1970, which is a continuation-in-part of application Ser. No. 758,572, Sept. 9, 1968, both now abandoned. This application Feb. 8, 1971, Ser. No. 113,735
Int. Cl. C08d 9/10; C08g 37/16
U.S. Cl. 260—3
16 Claims

ABSTRACT OF THE DISCLOSURE

The invention comprises a reinforced rubber composition including rubber, discontinuous fiber filaments, a finely-divided reinforcing siliceous pigment, and a resin formed by the reaction of a phenol with a methylene donor.

RELATED APPLICATIONS

This application is a continuation-in-part of application Ser. No. 8,059 filed Feb. 2, 1970, now abandoned, which is a continuation-in-part of application Ser. No. 758,572 filed Sept. 9, 1968, now abandoned.

BACKGROUND OF THE INVENTION

This invention relates to rubber compositions and, more particularly, to rubber compositions of the reinforced type, such as are used in manufacturing mechanical rubber goods.

Fabric reinforced rubber compositions have been in use for sometime; for example, in various types of drive belts, hoses, vehicular tires, and the like. The rubber compositions used in manufacturing such goods must possess certain physical characteristics. Specifically, such compositions must be resilient and strong. However, only a limited amount of elongation can be permitted during use of the manufactured goods. Furthermore, the rubber composition must have abrasion resistance and low heat build-up upon rapid flexing.

Non-reinforced rubber is normally sufficiently resilient and may provide sufficient strength at maximum elongation, which is usually at least 500 percent elongation. However, non-reinforced rubber is typically lacking in strength at small elongations and, therefore, needs reinforcement. For example, the rubber belts used for retreading tires should provide strength over a very limited elongation and the strength is required principally in the circumferential direction on the tire. Retreading belts also must have high abrasion resistance. In some uses, such as in automobile motor mounts and in chafer strips, the rubber goods must withstand repeated and rapid flexing without substantial heat build-up and the accompanying breakdown of the rubber.

In the past, reinforcement has been provided by embedding long cords, such as by calendering, in the rubber. The cords are typically comprised of nylon, rayon, or cotton. Although the rubber-cord composite provides resiliency together with strength and a limited elongation, it has certain inherent disadvantages. For example, it is often desirable to form the goods by extrusion and such a rubber-cord composite is not well adapted for extrusion. Also, various degrees of resiliency, strength, and elongation are required in different goods. In rubber-cord composites these characteristics cannot be easily varied over wide ranges. Furthermore, in some instances the properties with a given rubber-cord composite article may not be completely uniform. There may be weak areas within the article; for example, where the cords have not been uniformly spaced in the rubber or where the rubber is not uniformly bonded to the cords.

Discontinuous fiber glass filaments have been suggested for use in place of the embedded cords. The fiber glass filaments can be uniformly dispersed throughout the rubber material and large amounts of fiber glass filaments can be incorporated into the rubber with very little effect on the viscosity and general processing behavior. The rubber-fiber glass composite is particularly well adapted for extrusion. The rubber-fiber glass composite is not completely satisfactory, however, since its strength is materially less at low elongations as compared with fabric reinforced rubbers.

If the fiber glass filaments are coated with resorcinol-formaldehyde-latex and the coated fiber glass dispersed throughout the rubber, the rubber composition is found to be substantially stronger at low elongations. The coated chopped fiber glass filaments are produced by dipping or impregnating bare fiber glass in resorcinol-formaldehyde-latex and then chopping same prior to mixing with the rubber base. Although the rubber-impregnated fiber glass composite is found to possess satisfactory strength and elongation characteristics, it has the disadvantage of requiring an additional step in the manufacturing process; namely, dipping or impregnating the fiber glass prior to its being mixed with the rubber. The impregnated fiber glass is, of course, substantially more expensive than uncoated fiber glass. A need was thus discovered for means by which the more economical glass filaments could be added directly to the rubber.

The present invention provides a rubber-fiber glass composite in which uncoated chopped fiber glass can be added directly to the rubber base without the above-mentioned coating of the fibers. The present invention also provides a rubber-fiber glass composite having high strength at low elongations, high abrasion resistance, and low heat build-up from flexing. Also, the strength of the composite can be increased in any particular desired direction. The fiber glass filaments can be uniformly dispersed throughout the rubber base, thus providing uniform characteristics throughout the rubber composite. Furthermore, the amount of fiber glass incorporated in the rubber base can be varied over wide ranges, thus permitting selection of characteristics that are especially adapted to the particular type of article being manufactured.

GENERAL DISCUSSION

The present invention contemplates addition of discontinuous reinforced fiber filaments to a rubber compound which has been especially modified to provide a strong bonding between the rubber and the fiber filaments. The rubber compound is modified by adding thereto a finely-divided reinforcing siliceous pigment, a phenol, such as recorcinol, and a methylene donor, such as hexamethylenetetramine.

The rubber compound may be of any desired type, such as, for example, natural, synthetic, silicone, chloroprene, polybutadiene, polyisoprene, and EPDM rubbers. Furthermore, the rubber batch may contain any of the various additives conventionally included in rubber compounds, as desired; for example, reinforcing pigments (e.g., carbon black or silica), accelerators (e.g., guanidines), activators (e.g., zinc oxide), oil extenders (e.g., aromatic oils such as Sundex 53), curatives (e.g., sulfur), etc., without departing from the present invention. However, the broader aspects of the present invention do not necessarily require the presence of any particular additives except reinforcing siliceous pigment, a phenol, methylene donor, and discontinuous fiber filaments.

Various types of finely-divided, reinforcing, siliceous pigments (i.e., a pigment containing at least about 50 percent $SiO_2$ by weight on an anhydrous basis), such as silica and alkaline earth metal silicates; for example, calcium silicate, may be satisfactorily used in the present invention. The siliceous pigment should have an ultimate particle size in the range of 100 to 10,000 angstroms, preferably between 150 and 300 angstroms. The B.E.T. surface area of the pigment is preferably in the range of 50 to 400, usually 70 to 250, square meters per gram. Silica of the hydrated amorphous type has been found to be preferable. HiSil reinforcing siliceous pigment is a typical commercial form of such silica. The silica can be added to the rubber at any time prior to reacting the phenol with the methylene donor, but the best results are obtained if the silica is added to the rubber batch along with the other fillers during the Banbury mixing, thereby providing thorough dispersion of the silica throughout the batch. The silica may be added in any desired amount between 5 and 70 parts per hundred parts of rubber by weight (hereinafter referred to as "phr."). The preferred range of silica is between 10 and 20 phr. for optimum bonding between the rubber compound and the fiber glass filaments. It is desirable to reduce the amount of other reinforcing fillers added to the rubber batch by the amount of the silica added thereto. Although some improvement in bonding occurs between rubber and fiber glass with the present invention, without a siliceous pigment, the reinforcement is considerably greater when a siliceous pigment is present.

The phenol may, for example, be resorcinol or phloroglucinol. Resorcinol, however, has been found to be preferable. The resorcinol may be added to the rubber compound and dispersed during mixing in the Banbury. The temperature should be above 250° F., preferably 300° F., however, below scorching temperature, when the resorcinol is added, unless one of the special dispersible forms of resorcinol is used, such as a micronized blend of resorcinol and hydrated silica or a co-melt of resorcinol and stearic acid. When such dispersible forms of resorcinol are used, the addition may take place on the rubber mill at normal mill temperatures along with the curatives. The preferred range of resorcinol is between 0.5 and 5 phr.

The present invention principally intends the use of uncoated chopped fiber glass as the discontinuous, reinforcing fiber filaments. However, the broader aspects of the invention would include the use of both coated and uncoated fiber glass as well as other types of discontinuous, reinforcing fiber filaments; for example, nylon, cotton, polyester, steel (brass coated), asbestos, rayons typically used in tire reinforcement, the acrylics (e.g., Orlon— both fibers primarily of polyacrylonitrile as well as the so called mod acrylics which contain from about 35 to 85 percent acrylonitrile) and the like. Any fiber material is suitable so long as it possesses the particular desired modulus limits and is compatible with the siliceous pigment and the reaction product (condensation product) of the phenol and the methylene donor. The fiber should have a relatively small diameter, such as, for example, a maximum of 100 microns. The fiber should have as large a length-to-diameter ratio as possible; for example, between 10:1 and 1000:1 ratio or greater. The possible fiber length is limited only to that permitted by practical mixing and handling of the rubber compound.

The fiber glass may be provided in the form of chopped fiber glass cord; for example, between ⅛ and 2 inches in length, and preferably of a type that has been appropriately sized, such as with a silicone binder. The fiber glass preferably is added to the rubber batch during incorporation of the fillers and thus mixed into the rubber batch during the Banbury mixing or, in certain instances described hereinafter, it may be added during mill mixing. The chopped fiber glass cord is comprised of bundles of filaments and the mixing is found to break down the bundles into short, individual filaments which are uniformly dispersed throughout the rubber batch. The particular properties of the resulting rubber composite may be determined by the amount of fiber glass incorporated into the rubber compound. The amount of fiber glass added may be varied; for example, from 5 to 300 phr., depending upon the degree of fiber reinforcement desired. The properties of the rubber-fiber glass composite may be further varied by orienting the fibers to lie substantially in one direction; for example, by passing the mass of rubber composite through a mill, calender, or extruder once or, perhaps, several times in the same direction. The modulus reinforcement in that direction can thereby be substantially increased. This is particularly advantageous in the manufacture of retreading belts.

Various methylene donors may be used in the present invention, such as hexamethylenetetramine, hexamethoxymethylmelamine, paraformaldehyde, butyraldehyde, and "Cohedur A" (produced by Farbenfabrik Bayer A.G.). Hexamethylenetetramine is preferred. The hexamethylenetetramine must be thoroughly dispersed throughout the rubber batch either during Banbury mixing or during mixing on the mill. If the hexamethylenetetramine is added during Banbury mixing where the temperature is normally in excess of 250° F., the reaction between the resorcinol, silica, and hexamethylenetetramine takes place immediately. In such case, the fiber glass must be present when the hexamethylenetetramine is added and thus must be added during Banbury mixing. If the hexamethylenetetramine is added during mixing on the mill and the temperature is maintained below 250° F., the reaction does not take place until the rubber batch is heated above 250° F. such as during curing. In such case, the fiber glass may be added during mixing on the mill. The preferred range of hexamethylenetetramine is between 0.5 and 4.0 phr., usually between 0.8 and 1.6 phr.

DETAILED DESCRIPTION

Example I

In order to illustrate the effect of the present invention on various properties of a rubber composition, five rubber compounds were prepared as shown in Table I. Rubber compound I–A was used as the basic formulation and is of a type typically used in tire carcasses. Rubber compound I–B discloses one preferred mode of carrying out the present invention and was comprised of the basic formulation, further including hydrated amorphous silica, resorcinol, hexamethylenetetramine, and uncoated chopped fiber glass. Rubber compound I–C was comprised of the basic formulation plus hydrated amorphous silica, resorcinol, and hexamethylenetetramine but included no fiber glass. The amount of carbon black included was decreased by the amount of silica added. The rubber compound I–D was comprised of the basic formulation plus hydrated amorphous silica and uncoated chopped fiber glass. The carbon black was reduced by the amount of silica added. The rubber compound I–E was comprised of the basic formulation and further included coated chopped fiber glass.

TABLE I

| Rubber compound | Compound (parts by weight) | | | | |
|---|---|---|---|---|---|
| | I-A | I-B | I-C | I-D | I-E |
| SMR H5L (natural rubber) | 70 | 70 | 70 | 70 | 70 |
| Styrene butadiene rubber | 30 | 30 | 30 | 30 | 30 |
| SRF black [1] (carbon black) | 45 | 30 | 30 | 30 | 45 |
| Zinc oxide | 5 | 5 | 5 | 5 | 5 |
| Stearic acid | 2 | 2 | 2 | 2 | 2 |
| Sundex 790 (aromatic process oil) | 4 | 4 | 4 | 4 | 4 |
| Benzothiazyl disulfide | 0.85 | 0.85 | 0.85 | 0.85 | 0.85 |
| Diphenyl guanidine | 0.35 | 0.35 | 0.35 | 0.35 | 0.35 |
| Sulfur | 2.4 | 2.4 | 2.4 | 2.4 | 2.4 |
| Chopped fiber glass | | 10 | | 10 | [2] 10 |
| Silica [3] | | 15 | 15 | 15 | |
| Resorcinol | | 2.5 | 2.5 | | |
| Hexamethylenetetramine | | 1.6 | 1.6 | | |

[1] Semi-reinforcing furnace carbon black.
[2] Impregnated with resorcinol-formaldehyde-latex material.
[3] The silica used was a precipitated, hydrated silica having an ultimate particle size of 220 angstroms, a B.E.T. surface area of approximately 150 square meters per gram, and containing $SiO_2$—87.5%, $CaO$—0.75%, $R_2O_3$—0.95%, $NaCl$—1.6%. The silica had weight loss at 105° C. of 6.3% and the balance of the silica product was bound water.

The above rubber compounds were prepared by adding together the natural rubber, styrene butadiene, carbon black, zinc oxide, stearic acid, and aromatic process oil during Banbury mixing and then further combining benzothiazyl disulfide, diphenyl guanidine, and sulfur during mixing on the mill. The resorcinol, silica, and fiber glass, when included, were added during Banbury mixing. The hexamethylenetetramine, when included, was added during mixing on the mill at a normal mill temperature not in excess of 250° F. Subsequently, the rubber compounds were given a cure at 300° F. for 20 minutes. Thus, in the above rubber compound I–B the fiber glass was bonded into the rubber matrix during curing.

Table II shows the results of various tests conducted on the above rubber compounds.

TABLE II

| Rubber compound | I-A | I-B | I-C | I-D | I-E |
|---|---|---|---|---|---|
| 100% modulus, p.s.i. | 240 | 740 | 260 | 300 | 670 |
| 300% modulus, p.s.i. | 1,320 | 1,710 | 1,490 | 980 | 1,680 |
| Static modulus, p.s.i. | 820 | 820 | 800 | 710 | 900 |
| Dynamic modulus, p.s.i. | 939 | 1,113 | 935 | 1,056 | 1,067 |
| Tensile strength, p.s.i. | 3,060 | 2,710 | 3,190 | 2,620 | 2,250 |
| Elongation at break, percent | 510 | 430 | 510 | 540 | 400 |

The above table shows a very substantial increase in the modulus of the composite at lower elongations upon addition of silica, resorcinol, hexamethylenetetramine, and uncoated fiber glass. The rubber composition which includes the silica, resorcinol, hexamethylenetetramine and the uncoated, chopped fiber glass requires approximately three times the force to produce 100 percent elongation as does the basic rubber compound alone and more than twice as much as the rubber compound plus the uncoated fiber glass.

EXAMPLE II

This example illustrates the effect of various loadings of fiber glass in a rubber composition including silica, resorcinol, and hexamethylenetetramine. Five rubber compounds were prepared in which the formulation was the same except for variation in the fiber glass loading, as shown in Table III. The formulation by weight was as follows: SMR H5L (natural rubber)—70 phr., styrene butadiene rubber—30 phr., SRF black (carbon black)—30 phr., zinc oxide—5 phr., stearic acid—2 phr., Sundex 790 (aromatic process oil)—4 phr., benzothiazyl disulfide—0.85 phr., diphenyl guanidine—0.35 phr., sulfur—2.4 phr. To this basic rubber formulation was added hydrated amorphous silica [1]—20 phr., resorcinol—2.5 phr., and hexamethylenetetramine—1.6 phr. Fiber glass was also added in amounts varying from 0 to 150 phr. The rubber-fiber glass composite was cured for 30 minutes at 300° F. and tested according to ASTM procedures. Table III shows the results of the tests conducted at various fiber glass loadings.

TABLE III

| Rubber compound | II-A | II-B | II-C | II-D | II-E |
|---|---|---|---|---|---|
| Fiber glass, phr. | 0 | 15 | 30 | 60 | 150 |
| 100% modulus, p.s.i. | 270 | 740 | 1,010 | 1,300 | |
| Tensile strength, p.s.i. | 3,070 | 2,480 | 2,140 | 1,500 | 1,730 |
| Elongation at break, percent | 500 | 400 | 340 | 200 | 20 |

The amount of strength required and the amount of elongation permissible, of course, varies from one type of goods to another. Example II and Table III indicate that rubber-fiber glass composites can be prepared having widely-differing characteristics. For example, if the composite is to be used for manufacturing rubber goods in which the retractive force must be exerted over a very small elongation, then a composite with a large fiber glass loading may be selected, such as rubber compound II–E having 150 parts fiber glass per hundred parts rubber. This composite provides maximum strength of 1730 p.s.i. at 20 percent elongation. On the other hand, it may be permissible or even desirable in certain goods to have a

[1] Same type as in Example I.

greater elongation and a composite having the desired characteristics can be selected.

EXAMPLE III

This example illustrates the effect of the present invention an abrasion resistance and heat build-up during flexing. A rubber compound III–A, prepared according to the present invention, was compared to rubber compound III–B which included uncoated fiber glass reinforcement but did not include hydrated amorphous silica, resorcinol, and hexamethylenetetramine. The formulation used in preparing rubber compound III–A was identical to that of rubber compound II–E. The formulation used in preparing rubber compound III–B was identical to that of rubber compound II–E except that hydrated amorphous silica, resorcinol, and hexamethylenetetramine were not included. The rubber compounds III–A and III–B were both cured for 35 minutes and Pico abrasion tests were conducted on them. The test conducted on rubber compound III–A resulted in a score of 32, whereas the test conducted on rubber compound III–B resulted in a score of only 18. The rubber compounds III–A and III–B were further tested on the Goodrich Flexometer. Rubber compound III–A remained intact after 20 minutes of testing, and the heat build-up was only 75° F. Rubber compound III–B, on the other hand, fell apart after only 6 minutes of testing, at which time the heat build-up was 99° F. Thus, the rubber compound which included fiber glass, silica, resorcinol, and hexamethylenetetramine was shown to have superior abrasion and heat build-up characteristics as compared with the rubber compound which included only fiber glass.

EXAMPLE IV

In order to show the effect of fiber orientation, a rubber compound IV–A, identical to rubber compound III–A described in Example III, was prepared and was further given a small amount of milling by passing the compound IV–A through the mill 10 times, thereby orienting the fibers. The force parallel to the grain at 25 percent modulus was about 1400 p.s.i., whereas the force perpendicular to the grain at 25 percent modulus was only slightly above 400 p.s.i.

EXAMPLE V

One preferred embodiment of the present invention is rubber compound V–A which is suitable for use in chafer strips in automobile tires and would replace the calendered chafer strip fabric which has been used in the past. Such chafer strips should have resistance to flow during molding, dimensional stability under load, resistance to degradation under cyclic loading, high modulus, and stiffness. The properties of rubber compound V–A were compared with a similar rubber compound V–B which contained coated fiber glass and rubber compound V–C which contained no fiber glass but did contain a high loading of carbon black. The formulations of rubber compounds V–A, V–B, and V–C were as shown in Table IV.

TABLE IV

| Rubber compound | V-A | V-B | V-C |
|---|---|---|---|
| SMR H5L (natural rubber) | 100 | 100 | 100 |
| FEF black [1] (carbon black) | 20 | 50 | 75 |
| Silica [2] | 30 | | |
| Zinc oxide | 3 | 3 | 3 |
| Stearic acid | 2 | 2 | 2 |
| Antioxidant | 1 | 1 | 1 |
| Sulfenamide accelerator | 1.0 | 0.8 | 0.8 |
| Sulfur | 2.5 | 2.5 | 2.25 |
| Fiber glass | 75 | [3] 75 | |
| Diphenyl guanidine | 2.5 | | |
| Resorcinol | 2.5 | | |
| Hexamethylenetetramine | 1.5 | | |

[1] Fast-extruding furnace carbon black.
[2] Same type as in Example I.
[3] Impregnated with resorcinol-formaldehyde-latex material.

The rubber compounds in Example V were conventionally mixed and cured for 30 minutes at 300° F. In rubber compound V–A, the hydrated amorphous silica, resorcinol, hexamethylenetetramine, and fiber glass were added during Banbury mixing at a temperature of 300° F. and, therefore, the fiber glass was bonded into the rubber matrix at that time. The following Table V shows the results of various tests conducted on the rubber compounds of Example V.

TABLE V

| Rubber compound | V-A | V-B | V-C |
|---|---|---|---|
| 100% modulus, p.s.i | | 870 | 1,040 |
| Tensile, p.s.i | 2,080 | 2,060 | 3,000 |
| Elongation at break, percent | 90 | 260 | 270 |
| Shore A hardness | 91 | 85 | 77 |
| ASTM "B" set, percent | 17 | 28 | 30 |
| Goodrich flexometer: | | | |
| Heat build-up, °F | 33 | 115 | 55 |
| Dynamic compression, percent | 2.1 | −4.3 | 2.5 |
| Permanent set, percent | 0.9 | | 1.4 |

As shown in Table V, the rubber compound V-A of the present invention has superior properties for chafer strips. Rubber compound V-A has excellent hardness, stiffness, resistance to set, and dynamic properties. Resistance to mold flow can be easily developed in compound V-A by semi-curing.

EXAMPLE VI

Rubber compounds VI-A through VI-F were prepared, vulcanized and tested as follows:

TABLE VI

| Rubber compound | VI-A | VI-B | VI-C | VI-D | VI-E | VI-F |
|---|---|---|---|---|---|---|
| SMR-H5L (natural rubber) | 100 | 100 | 100 | 100 | 100 | 100 |
| Silica [1] | 25 | 25 | 25 | 25 | 25 | 25 |
| Zinc oxide | 5 | 5 | 5 | 5 | 5 | 5 |
| Stearic acid | 4 | 4 | 4 | 4 | 4 | 4 |
| Mercaptobenzothiazyl disulfide | 0.7 | 0.7 | 0.7 | 0.7 | 0.7 | 0.7 |
| Sulfur | 2.5 | 2.5 | 2.5 | 2.5 | 2.5 | 2.5 |
| Resorcinol | 2.5 | 2.5 | 2.5 | 2.5 | 2.5 | 2.5 |
| Hexamethylenetetramine | 1.6 | 1.6 | 1.6 | 1.6 | 1.6 | 1.6 |
| Acrylic fiber | 0 | 5 | 10 | 40 | 80 | 100 |
| Properties: | | | | | | |
| Tensile, p.s.i | 4,060 | 2,350 | 1,710 | 2,250 | 3,520 | 3,900 |
| Elongation at break | 640 | 440 | 320 | 100 | 40 | 20 |
| Yerzley static modulus, p.s.i | 520 | 700 | 900 | 2,600 | >4,000 | >10,700 |
| Yerzley dynamic modulus, p.s.i | 799 | 979 | 1,267 | 3,818 | >6,035 | >12,867 |
| Yerzley resilience, percent | 80 | 74 | 74 | 72 | 71 | 67 |

[1] Same as the silica used in Example I.

EXAMPLE VII

The rubber compounds shown in the following Table VII were conventionally mixed in a Banbury at 300° F. and cured on a mill at 150° F. From the Yerzley test data (ASTM D 945–55) it can be seen that the compounds of the invention have good resistance to deformation and good resilience.

TABLE VII

| | Compound (parts by weight) | | | | | | | |
|---|---|---|---|---|---|---|---|---|
| Rubber compound | VII-A | VII-B | VII-C | VII-D | VII-E | VII-F | VII-G | VII-H |
| SMR-H5L (natural rubber) | 100 | 100 | 100 | 100 | 100 | 100 | 100 | 100 |
| Silica [1] | 25 | 25 | 25 | 25 | 25 | 25 | 25 | 25 |
| Nylon fiber [2] | 0 | 10 | 20 | 40 | 100 | 125 | 100 | 125 |
| Resorcinol | 2.5 | 2.5 | 2.5 | 2.5 | 2.5 | 2.5 | 2.5 | 2.5 |
| XR-124 [3] | 0 | 0 | 0 | 0 | 0 | 0 | 4.2 | 4.2 |
| Zinc oxide | 5 | 5 | 5 | 5 | 5 | 5 | 5 | 5 |
| Hexamethylenetetramine | 1.6 | 1.6 | 1.6 | 1.6 | 1.6 | 1.6 | 1.6 | 1.6 |
| Mercaptobenzothiazyl disulfide | 0.7 | 0.7 | 0.7 | 0.7 | 0.7 | 0.7 | 0.7 | 0.7 |
| Diphenyl guanidine | 0.3 | 0.3 | 0.3 | 0.3 | 0.3 | 0.3 | 0.3 | 0.3 |
| Sulfur | 2.5 | 2.5 | 2.5 | 2.5 | 2.5 | 2.5 | 2.5 | 2.5 |
| Properties: | | | | | | | | |
| Tensile, p.s.i | 3,920 | 2,090 | 1,420 | 1,310 | 1,440 | 1,560 | | |
| Elongation at break, percent | 630 | 460 | 320 | 100 | 30 | 20 | | |
| Yerzley static modulus, p.s.i | 580 | 710 | 920 | 1,410 | 3,120 | 2,760 | 3,040 | 4,400 |
| Yerzley dynamic modulus, p.s.i | 541 | 986 | 1,309 | 2,357 | 8,674 | 6,445 | 5,949 | 8,674 |
| Yerzley resilience, percent | 87 | 75 | 74 | 68 | 54 | 58 | 57 | 56 |

[1] Same type as used in Example I.
[2] Nylon tire cord having 60 cuts to the inch and a diameter of approximately 1/10 of the length (0.4 mm. long with a diameter of 20–35 microns) and blended herein with an equal amount by weight of natural rubber in a Banbury for 10 minutes.
[3] A product sold by Harwick, Inc. comprising 60% resorcinol and 40% stearic acid.

EXAMPLE VIII

The Orlon filled compositions shown in Table VIII were conventionally mixed in a Banbury at 300° F. and cured on a mill at 150° F. The ingredients from zinc oxide to sulfur were added on the mill. From the Yerzley test data (ASTM D 945–55) it can be seen that the compounds of the invention have good resistance to deformation and good resilience.

TABLE VIII

| | Compound (parts by weight) | | | | | | | | |
|---|---|---|---|---|---|---|---|---|---|
| Rubber compound | VIII-A | VIII-B | VIII-C | VIII-D | VIII-E | VIII-F | VIII-G | VIII-H | VIII-I |
| SMR-H5L (natural rubber) | 100 | 100 | 100 | 100 | 100 | 100 | 100 | 100 | 100 |
| Silica [1] | 25 | 25 | 25 | 25 | 25 | 25 | 25 | 25 | 25 |
| Acrylic fiber [2] | 0 | 5 | 10 | 20 | 40 | 60 | 80 | 100 | 120 |
| Resorcinol | 2.5 | 2.5 | 2.5 | 2.5 | 2.5 | 2.5 | 2.5 | 2.5 | 2.5 |
| Zinc oxide | 5 | 5 | 5 | 5 | 5 | 5 | 5 | 5 | 5 |
| Stearic acid | 4 | 4 | 4 | 4 | 4 | 4 | 4 | 4 | 4 |
| Hexamethylenetetramine | 1.6 | 1.6 | 1.6 | 1.6 | 1.6 | 1.6 | 1.6 | 1.6 | 1.6 |
| Mercaptobenzothiazyl disulfide | 0.7 | 0.7 | 0.7 | 0.7 | 0.7 | 0.7 | 0.7 | 0.7 | 0.7 |
| Diphenyl guanidine | 0.3 | 0.3 | 0.3 | 0.3 | 0.3 | 0.3 | 0.3 | 0.3 | 0.3 |
| Sulfur | 2.5 | 2.5 | 2.5 | 2.5 | 2.5 | 2.5 | 2.5 | 2.5 | 2.5 |
| Properties: | | | | | | | | | |
| Tensile, p.s.i | 4,060 | 2,350 | 1,710 | 1,840 | 2,250 | 3,240 | 3,520 | 3,990 | 3,900 |
| Elongation at break, percent | 640 | 440 | 320 | 100 | 100 | 70 | 40 | 30 | 20 |
| Yerzley static modulus, p.s.i | 520 | 700 | 900 | 1,290 | 2,600 | >4,000 | >5,800 | >7,300 | >10,700 |
| Yerzley dynamic modulus, p.s.i | 799 | 979 | 1,267 | 1,854 | 3,818 | >6,035 | >7,979 | >12,187 | >2,867 |
| Yerzley resilience, percent | 80 | 74 | 74 | 73 | 72 | 67 | 71 | 68 | |

[1] Same type as used Example I.
[2] Orlon fiber having 60 cuts to the inch and a diameter of approximately 1/10 of the length.

EXAMPLE IX–XI

In accordance with the procedure of the previous two examples, rubber compounds employing polyester and rayon tire cord were prepared and tested and were found to have approximately the same desirable properties. Similar results are also found when tire compounds employ conventional hard-drawn steel tire wire (coated with a brass compound, e.g., 70% copper and 30% zinc) of from ⅛, ¼ and ½ inch length with a diameter of .006 inch. These wire filled compounds show excellent fatigue resistance rendering them useful for tire carcasses.

As the foregoing data show, changes in the vulcanizate properties are outstanding, especially dynamic and static modulus.

Although the present invention has been described with reference to the specific details of particular embodiments thereof, it is not intended thereby to limit the scope of the invention except insofar as the specific details are recited in the appended claims.

We claim:

1. A reinforced rubber composition comprising rubber selected from natural, silicone, chloroprene, polybutadiene, polyisoprene, and EPDM rubbers and mixtures of such rubbers, finely-divided reinforcing siliceous pigment in the range of 5 to 70 phr., fiber filaments having a maximum diameter of 100 microns and a length-to-diameter ratio between 10:1 and 1000:1, and a resin produced in situ by the condensation of at least about 0.5 phr. of a phenol selected from the group consisting of resorcinol and phloroglucinol with at least about 0.5 phr. of methylene donor selected from the group consisting of hexamethoxymethyl melamine, paraformaldehyde, and butyraldehyde.

2. The rubber composition as defined in claim 1 wherein said methylene donor is hexamethylenetetramine.

3. The rubber composition as defined in claim 1 wherein said finely-divided reinforcing siliceous pigment has a surface area in the range of 50 to 400 square meters per gram.

4. The rubber composition as defined in claim 1 wherein said phenol is resorcinol.

5. The rubber composition as defined in claim 1 wherein said fiber filaments are selected from the group consisting of nylon, polyester, brass coated steel, cotton, asbestos, rayon, acrylic, and fiber glass.

6. A reinforced rubber composition comprising rubber, selected from natural, silicone, chloroprene, polybutadiene, polyisoprene, and EPDM rubbers and mixtures of such rubbers, siliceous pigment in the range of 5 to 70 phr., chopped fiber glass having a maximum diameter of 100 microns and a length-to-diameter ratio between 10:1 and 1000:1 in the range of 5 to 300 phr., and the condensation product of (1) resorcinol in the range of 0.5 to 5 phr. and (2) hexamethylenetetramine in the range of 0.5 to 4 phr.

7. The rubber composition as defined in claim 6 wherein said fiber glass has been sized with a binder.

8. The rubber composition as defined in claim 6 wherein the resorcinol is a form dispersible at factory mill processing temperatures selected from the group consisting of (1) a micronized blend of resorcinol and hydrated siliceous pigment, and (2) a co-melt of resorcinol and stearic acid.

9. The rubber composition as defined in claim 6 wherein said rubber is principally natural rubber.

10. The rubber composition as defined in claim 6 wherein the siliceous pigment is in the range of 10 to 20 phr., the resorcinol is in the range of 1.25 to 2.5 phr., and the hexamethylenetetramine is in the range of 0.8 to 1.6 phr.

11. A method of reinforcing rubber compositions comprising the steps of:

adding resorcinol in the range of 0.5 to 5 phr., siliceous pigment in the range of 5 to 70 phr., hexamethylenetetramine in the range of 0.5 to 4 phr., and chopped fiber glass in the range of 5 to 300 phr. having a maximum of 100 microns and a length-to-diameter ratio between 10:1 and 1000:1, to the rubber batch containing rubber selected from natural, silicone, chloroprene, polybutadiene, polyisoprene, and EPDM rubbers and mixtures of such rubbers, and mixing thereof, whereby the resorcinol, siliceous pigment, hexamethylenetetramine, and chopped fiber glass are dispersed throughout the rubber batch and fiber glass is substantially broken down into individual filaments; and reacting the resorcinol with the hexamethylenetetramine whereby a resin is formed bonding the fiber glass filaments into the rubber matrix.

12. The method as defined in claim 1 including a step of orienting the fiber glass filaments.

13. The method as defined in claim 11 wherein the resorcinol is added at a mixing temperature in a Banbury of at least 250° F. and wherein the hexamethylenetetramine is added at a mixing temperature on a mill of less than 250° F. and including a further step of curing the rubber composition at a temperature of at least 250° F., whereby said resorcinol and said hexamethylenetetramine are reacted during said curing step.

14. A method as defined in claim 11 wherein said resorcinol and said hexamethylenetetramine are added at a mixing temperature in a Banbury of at least 250° F., whereby said resorcinol and said hexamethylenetetramine at the elevated temperature are immediately reacted to bond the fiber glass filaments into the rubber matrix.

15. A rubber composition which becomes reinforced upon heat treatment, said composition comprising rubber, selected from natural, silicone, chloroprene, polybutadiene, polyisoprene, and EPDM rubbers and mixtures, finely-divided reinforcing siliceous pigment, at least about 0.5 phr. of a phenol selected from the group consisting of resorcinol and phloroglucinol, at least about 0.5 phr. of an aldehyde or amine aldehyde condensate methylene donor, and 5 to 300 phr. of fiber filaments having a maximum diameter of 100 microns and a length-to-diameter ratio between 10:1 and 1000:1.

16. A rubber composition as defined in claim 15 wherein said siliceous pigment comprises silica in the range of 5 to 70 phr., said phenol comprises resorcinol in the range of 0.5 to 5 phr., said methylene donor is hexamethylenetetramine in the range of 0.5 to 4 phr., and said fiber filaments comprise fiber glass in the range of 5 to 300 phr.

References Cited

UNITED STATES PATENTS

| | | | |
|---|---|---|---|
| 2,809,173 | 10/1957 | Dereniuk | 260—41.5 |
| 3,350,345 | 10/1967 | Vanderbilt et al. | 260—41.5 |
| 3,366,583 | 1/1968 | Wilson | 260—3 |
| 3,507,689 | 4/1970 | Freytag et al. | 260—3 |
| 3,517,722 | 6/1970 | Endter et al. | 260—845 |

FOREIGN PATENTS

| | | | |
|---|---|---|---|
| 1,483,340 | 6/1967 | France | 260—3 |

OTHER REFERENCES

Shchichko et al., "Soviet Rubber Technology" NR1, vol. 25, January 1966, pp. 18–21.

JOHN C. BLEUTGE, Primary Examiner

U.S. Cl. X.R.

152—330, 362 CS; 260—17.2, 23.7 M, 33.6 AQ, 38, 41.5 A, 826, 839, 845, 846, 848

PO-1050
(5/69)

UNITED STATES PATENT OFFICE
CERTIFICATE OF CORRECTION

Patent No. 3,746,669          Dated July 17, 1973

Inventor(s) Donald D. Dunnom, et al

It is certified that error appears in the above-identified patent and that said Letters Patent are hereby corrected as shown below:

Claim 11, column 10, line 5

After "maximum" insert ---diameter---;

Claim 12, column 10, line 18 cancel "1" and insert ---11---.

Signed and sealed this 20th day of November 1973.

(SEAL)
Attest:

EDWARD M. FLETCHER, JR.          RENE D. TEGTMEYER
Attesting Officer          Acting Commissioner of Patents